United States Patent
Liu et al.

(10) Patent No.: US 8,569,443 B1
(45) Date of Patent: Oct. 29, 2013

(54) COPOLYTHIOPHENE SEMICONDUCTORS FOR ELECTRONIC DEVICE APPLICATIONS

(71) Applicant: Xerox Corporation, Norwalk, CT (US)

(72) Inventors: Ping Liu, Mississauga (CA); Yiliang Wu, Oakville (CA); Cameron Derry, London (CA); Anthony James Wigglesworth, Oakville (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/718,308
(22) Filed: Dec. 18, 2012

(51) Int. Cl.
C08G 75/00 (2006.01)
(52) U.S. Cl.
USPC ............ 528/377; 528/380; 528/370; 252/500
(58) Field of Classification Search
USPC ......................... 252/500; 528/377, 380, 370
See application file for complete search history.

(56) References Cited

U.S. PATENT DOCUMENTS

| | | | |
|---|---|---|---|
| 6,770,904 B2 | 8/2004 | Ong et al. | |
| 6,890,868 B2 | 5/2005 | Wu et al. | |
| 7,968,871 B2 | 6/2011 | Wu et al. | |
| 2005/0159580 A1 | 7/2005 | Liu et al. | |
| 2006/0041103 A1* | 2/2006 | Ong et al. | 528/373 |
| 2006/0237695 A1* | 10/2006 | Williams et al. | 252/500 |
| 2007/0284572 A1 | 12/2007 | Ong et al. | |
| 2010/0140555 A1 | 6/2010 | Liu et al. | |
| 2010/0219409 A1 | 9/2010 | Ong et al. | |
| 2010/0301344 A1 | 12/2010 | Wu et al. | |

* cited by examiner

Primary Examiner — Shane Fang
(74) Attorney, Agent, or Firm — Oliff & Berridge, PLC

(57) ABSTRACT

A semiconducting copolythiophene composition that includes repeating units obtained from the copolymerization of compounds of Formula (2):

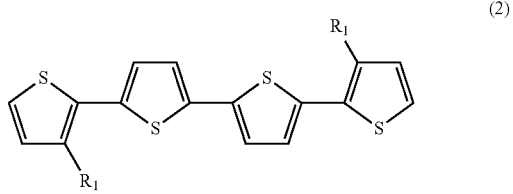

and Formula (3):

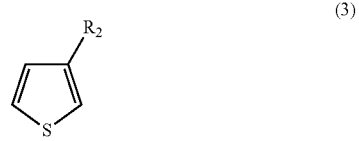

in which the copolythiophene has at least two repeating units (possessing side chains, such as alkyl side chains), which are arranged in manner such that the side chains on the polythiophene backbone are distributed non-uniformly, is described. Electronic devices incorporating such copolythiophene compositions are also described.

20 Claims, 2 Drawing Sheets

COPOLYTHIOPHENE SEMICONDUCTORS FOR ELECTRONIC DEVICE APPLICATIONS

TECHNICAL FIELD

The present disclosure is generally directed to polythiophenes and applications thereof for fabrication of flexible and ultra low-cost electronics. More specifically, the present disclosure is directed to a class of polythiophene copolymer (copolythiophenes) having certain repeating units (possessing side chains, such as alkyl side chains), which may be arranged in a random manner, such that the side chains on the polythiophene backbone are distributed non-uniformly. Such copolythiophenes are, for example, useful as active semiconductive materials for thin-film transistors (TFTs) and/or other electronic devices comprising a semiconducting composition or layer that can be deposited via solution processes, such as spin-coating, dip-coating and ink jet printing in ambient conditions.

BACKGROUND

Organic semiconductors have received extensive attention in recent years due to their potential applications for large-area, flexible and ultra low-cost electronics by solution processes. For example, semiconductive polymers like certain polythiophenes, which are useful as active semiconductor materials in thin film transistors (TFTs), have been reported. Nonetheless, many of the semiconductor polythiophenes are not stable when exposed to air as they become oxidatively doped by ambient oxygen. Accordingly, with many of these materials, rigorous precautions have to be undertaken during materials processing and device fabrication to exclude environmental oxygen to avoid or minimize oxidative doping. In addition to low stability when exposed to air, most high-performance organic semiconductors also suffer from poor solution processability.

For example, high-performance polythiophene semiconductors, such as PQT, for electronic device applications such as organic thin film transistors (OTFTs) are not sufficiently soluble in most common organic solvents. Thus, these semiconductors are processed in environmentally undesirable chlorinated solvents such as chlorobenzene or dichlorobenzene for optimal electronic properties. Therefore, it is important to develop new organic semiconductors with both high stability in air and good solution processability in non-chlorinated solvents to allow device fabrications through solution processes, such as spin-coating, dip-coating and ink-jet printing in ambient conditions.

SUMMARY

The present disclosure provides a composition containing a random copolythiophene of formula (1):

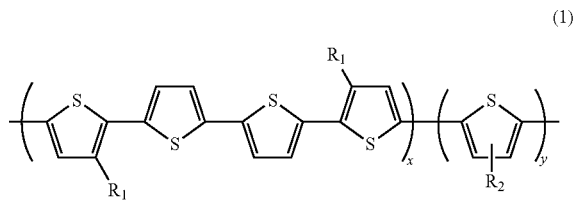

(1)

where $R_1$ and $R_2$ are the same or different and each is an alkyl, alkoxyalkyl, or perhaloalkyl. In embodiments, x and y are each greater than 0, and together equal 100 mole percent.

The present disclosure further provides an electronic device containing a semiconducting layer, where the semiconducting layer comprises a random copolythiophene of formula (1), where $R_1$ and $R_2$ are the same or different and each is an alkyl having from 1 to about 20 carbon atoms. In embodiments, x and y are each greater than 0 and together equal 100 mole percent.

This disclosure also provides a method of making a random copolythiophene. The method involves, for example, copolymerizing a compound of the formula (2):

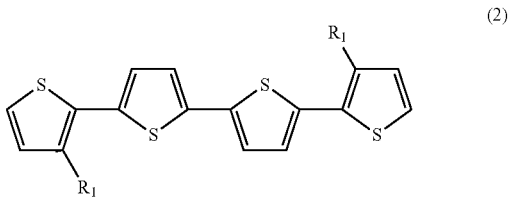

(2)

with a compound of formula (3):

(3)

to form a random copolythiophene of formula (1), where x and y are each greater than 0 and together equal 100 mole percent.

EMBODIMENTS

The present disclosure is directed, in various embodiments, to copolythiophenes, such as copolythiophenes do not require the use of chlorinated solvents to achieve high solubility. These copolythiophenes also have high mobility and good on/off ratio performance.

In this specification and the claims that follow, singular forms such as "a," "an," and "the" include plural forms unless the content clearly dictates otherwise. All ranges disclosed herein include, unless specifically indicated, all endpoints and intermediate values.

As used herein, the modifier, "about," used in connection with a quantity is inclusive of the stated value and has the meaning dictated by the context (for example, it includes at least the degree of error associated with the measurement of the particular quantity). When used in the context of a range, the modifier, "about," should also be considered as disclosing the range defined by the absolute values of the two endpoints. For example, the range, "from about 2 to about 4," also discloses the range, "from 2 to 4."

As used herein, "self-assembly" refers to the ability of molecules to organize themselves into a higher molecular structural order in response to a stimulus such as a change in solvency of the liquid for the polymer.

As used herein, "gelling" and "gelation" refer to formation of a three-dimensional polymer network of a polymer in a liquid through intermolecular interaction such as hydrogen bonding or van der Waals interactions, while the liquid is adsorbed in the three-dimensional network.

The present disclosure provides, in embodiments, semiconductor polymers such as copolythiophenes, which are useful for microelectronic device applications, such as TFTs.

Figure 1:
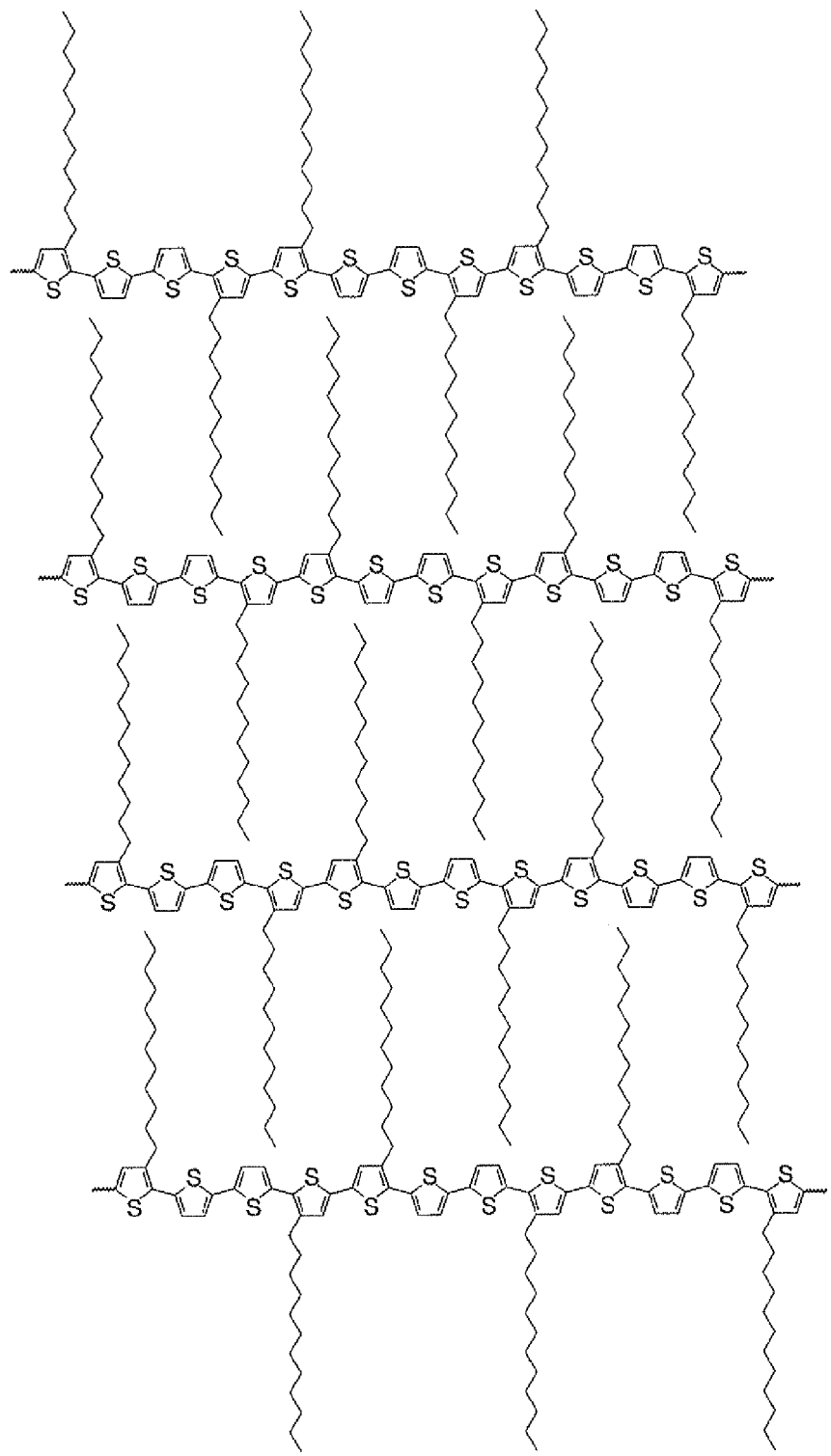
FIG. 1 illustrates lamellar ordering of regioregular polythiophenes.

Generally, polythiophenes in solution present strong self-assembly ability owing to the regioregular placement of long pendant side-chains along their backbone, promoting intermolecular side-chain interdigitation leading to extensive lamellar ordering in solution, as shown in FIG. 1. However, this ordering also leads to solution gelation at room temperature (about 20° C. to about 25° C.). While gelation is an indicator of increased structural order of certain self-organizable polymers, gelling is generally considered undesirable because a composition turned into a gel is difficult to solution coat at room temperature.

This self-organizing behavior of conventional polythiophenes in solution is greatly suppressed or eliminated in the copolythiophenes of the present disclosure by altering the structural regioregularity via incorporation of 3-alkylthiophene in the polymer chain. In embodiments, for example, perturbing of the structural regioregularity of the polythiophene is accomplished via incorporation of solution regioregularity interrupting monomers, such as 3-alkylthiophene, in a PQT polymer chain. In embodiments, while incorporation of solution regioregularity interrupting monomers, such as 3-alkylthiophene, into the PQT polymer chain inhibits gelation of the copolythiophene in solution, the copolythiophene maintains a strong tendency to self-assemble in the solid state. As a result, high mobility is still obtained. In this way, the solubility of the copolythiophene can be tuned, improving solution processability, while high mobility is still achieved.

In embodiments, the semiconducting copolythiophenes of the instant disclosure are copolythiophenes of the following formula (1):

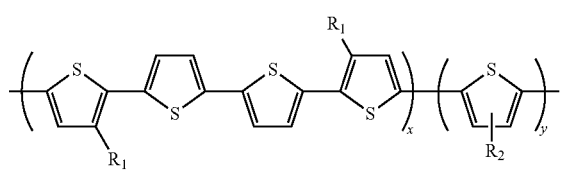

(1)

wherein $R_1$ and $R_2$ may be the same or different and may each be a side chain comprised of, for example, alkyl or alkyl derivatives having, for example, from about 1 to about 25 carbon atoms, such as from about 5 to about 20 carbon atoms, or from about 6 to about 20 carbon atoms, or from about 8 to about 12 carbon atoms, such as alkoxyalkyl, siloxy-substituted alkyl, perhaloalkyl, such as perfluoro, and the like; x and y may be the same or different and are each greater than 0; and x and y together equal 100 mole percent.

The term "alkyl" refers, for example, to a radical composed entirely of carbon atoms and hydrogen atoms, which is fully saturated. The alkyl radical may be linear, branched, or cyclic.

The term "substituted" refers to at least one hydrogen atom on the named radical being substituted with another functional group, such as halogen, —CN, —COOH, NH$_2$, and SH. An exemplary haloalkyl group is a perhaloalkyl group, wherein one or more hydrogen atoms in an alkyl group are replaced with halogen atoms, such as fluorine, chlorine, iodine, and bromine.

Suitable alkyl groups include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, cyclopentyl, cyclohexyl, cycloheptyl, and mixtures thereof. The alkyl group is optionally substituted one or more times with, for example, a halogen, such as chlorine, bromine, fluorine, or iodine, or a heteroatom-containing group, or a mixture thereof.

In embodiments, x and y may be the same or different. The variable x can be represented by the formula 0<x<100, and may be from about 10 to about 95 mole percent, such as from about 30 to about 80 mole percent, or from about 50 to about 70 mole percent. The variable y may be represented by the formula 0<y<100, and may be from about 5 to about 90 mole percent, such as from about 20 to about 70 mole percent, or from about 30 to about 50 mole percent. In embodiments, the sum of x and y is 100 mole percent. In other words, the relationship between x and y may be represented by the formula: 100=x+y, where x and y are as defined above.

In embodiments, the weight average molecular weight ($M_w$) of the copolythiophenes of the present disclosure may be selected for the intended application. In specific embodiments, the weight average molecular weight ($M_w$) thereof may be from about 1000 to about 200,000, such as from about 2000 to about 100,000, or from about 5000 to about 50,000, or from about 10,000 to about 30,000, as measured by gel permeation chromatography using polystyrene standards.

In embodiments, the polydispersity index ($M_w/M_n$) of the copolythiophenes according to the instant disclosure may be from about 1.5 to about 6.0, such as from about 2.0 to about 4.0, or from about 2.5 to about 3.0.

In embodiments, the copolythiophene according to formula (I) is a random copolymer.

The copolythiophenes of the present disclosure may be synthesized using methods known in the art.

For example, in embodiments, a copolythiophene according to the instant disclosure may be prepared by copolymerizing a compound of the formula (2):

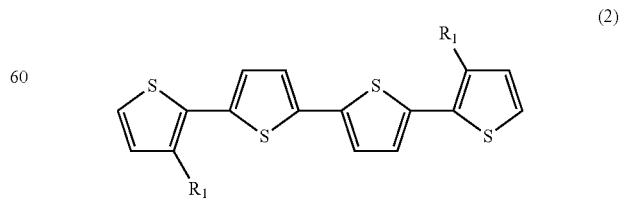

(2)

with a compound of formula (3):

to yield a random copolythiophene of formula (1). An additional synthetic methodology may be by way of a metal halide-mediated oxidative coupling polymerization in an appropriate solvent, as discussed in U.S. Patent Application Publication No. 2005/0159580, the entire disclosure of which is hereby incorporated by reference in its entirety. For example, in embodiments, the copolythiophenes according to the instant disclosure may be prepared via a ferric chloride ($FeCl_3$) mediated coupling polymerization, in a suitable reaction medium under appropriate conditions according, for example, to the following Scheme I:

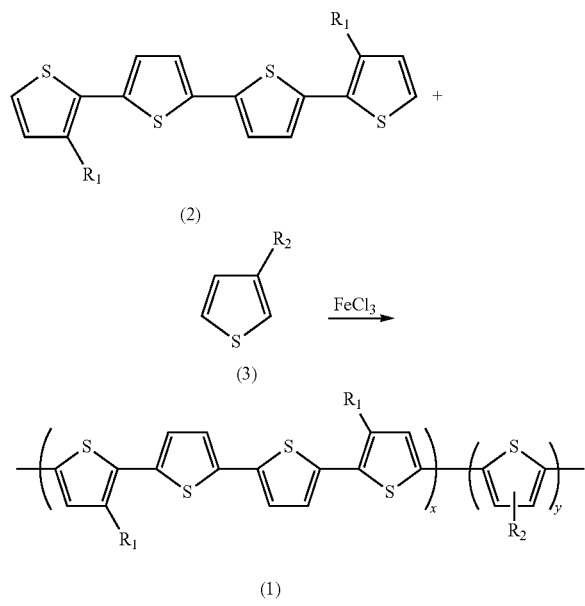

Because the solubility of the copolythiophenes of the present disclosure can be tuned, more common organic solvents can be used to form a deposition solution. The solvents may include toluene, xylene, mesitylene, trimethylbenzene, ethylbenzene, ethyl toluene, propylbenzene, diethylbenzene, tetrahydronaphthalene, chlorobenzene, and dichlorobenzene. In embodiments, nonchlorinated solvents can be used. Exemplary nonchlorinated solvents include toluene, xylene, mesitylene, trimethylbenzene, ethylbenzene, ethyl toluene, propylbenzene, tetrahydronaphthalene, and diethylbenzene. For example, in embodiments, the copolythiophenes of the instant disclosure may possess a solubility of at least 0.05% by weight in these exemplary non-chlorinated solvents, such as at least 0.1% by weight, or at least 0.5% by weight. In embodiments, the solubility of the copolythiophenes of the instant disclosure in a non-chlorinated solvent is from about 0.05 wt % to about 10 wt %.

In embodiments, the crude copolymer (1) obtained by this method may be treated with $NH_4OH$ solution to remove extra $FeCl_3$. In embodiments, the crude polymer (1) may be further purified by soxhlet extraction with hexane to remove lower molecular fractions in the copolymer. In embodiments, the crude copolymer (1) may be further treated with chlorobenzene to collect purified product. The final product in chlorobenzene may be precipitated in MeOH and collected, for example, by filtration. In embodiments, the product may also be dried under vacuum.

The deposition solution may be used to deposit the copolythiophene to form a semiconducting layer by known methods. Such semiconducting layers may be included, for example, in electronic devices, such as thin-film transistors (TFTs).

TFTs are generally composed of a supporting substrate, three electrically conductive electrodes (gate, source and drain electrodes), a channel semiconducting layer, and an electrically insulating gate dielectric layer separating the gate electrode from the semiconducting layer.

In embodiments, the semiconducting layer may further comprise another organic semiconductor material. Examples of other suitable organic semiconductor materials may include acenes, such as anthracene, tetracene, pentacene, and their substituted derivatives, perylenes, fullerenes, oligothiophenes, other semiconducting polymers such as triarylamine polymers, polyindolocarbazole, polycarbazole, polyacenes, polyfluorene, phthalocyanines such as copper phthalocyanines or zinc phthalocyanines and their substituted derivatives.

The semiconducting layer may be any suitable thickness, such as a thickness of from about 5 nm to about 1000 nm, or from about 8 nm to about 500 nm thick, or from about 10 nm to about 100 nm thick.

In embodiments, the semiconducting layer may be formed by any suitable method, such as from a liquid composition, or a dispersion or solution, which is then deposited onto a substrate, such as a substrate of a transistor. Suitable deposition methods may include liquid deposition, such as spin coating, dip coating, blade coating, rod coating, screen printing, stamping, ink jet printing.

The substrate may be composed of any suitable material, such as materials including silicon, glass plate, and plastic film or sheets. For structurally flexible devices, plastic substrate, such as, for example, polyester, polycarbonate, polyimide sheets and the like may be used. The thickness of such a substrate may be from about 10 micrometers to over 10 millimeters, such as flexible plastic substrate of from about 50 micrometers to about millimeters, or 500 micrometers to about 2 millimeters; or a rigid substrate such as glass or silicon of from about 0.5 millimeter to about 10 millimeters, or from about 1 millimeter to about 5 millimeters.

The gate electrode may be composed of an electrically conductive material. The gate electrode material may be a thin metal film, a conducting polymer film, a conducting film made from conducting ink or paste, or the substrate itself, for example heavily doped silicon. Examples of gate electrode materials include aluminum, gold, silver, chromium, indium tin oxide, conductive polymers such as polystyrene sulfonate-doped poly(3,4-ethylenedioxythiophene) (PSS-PEDOT), and conducting ink/paste comprised of carbon black/graphite or silver colloids. The gate electrode may be prepared by vacuum evaporation, sputtering of metals or conductive metal oxides, conventional lithography and etching, chemical vapor deposition, spin coating, casting or printing, or other deposition processes. For metal films, thickness of the gate electrode may be from about 10 nm to about 500 nm, such as from about 15 to about 400 nm, or from about 20 to about 200 nm. For conductive polymers, the thickness of the gate electrode may be from about 0.5 to about 10 micrometers, such as from about 1 to about 9 micrometers, or from about 2 to about 8 micrometers.

The dielectric layer may be, for example, an inorganic material film, an organic polymer film, or an organic-inorganic composite film. Examples of inorganic materials suitable as the dielectric layer include silicon oxide, silicon nitride, aluminum oxide, barium titanate, barium zirconium titanate and the like. Examples of suitable organic polymers or copolymers include polyesters, polycarbonates, poly(vinylphenol), polyimides, polystyrene, polymethacrylates, polyacrylates, epoxy resin, polyacrylonitrile, polymethacrylonitrile, poly(methyl methacrylates-co-vinylphenol), poly (methacrylates-co-vinylphenol), poly(acrylonitrile-co-methacrylonitrile), and the like. The thickness of the dielectric layer depends on the dielectric constant of the material used and can be, for example, from about 10 nanometers to about 500 nanometers, such as from about 20 nanometers to about 400 nanometers, or from about 30 nanometers to about 300 nanometers. The dielectric layer may have a conductivity that is, for example, less than about $10^{-12}$ Siemens per centimeter (S/cm). The dielectric layer may be formed according to any suitable process, including those processes described in forming the gate electrode.

In embodiments, an interfacial layer may be placed between the dielectric layer and the semiconducting layer. Such an interfacial layer may be designed to influence the TFT's properties (as charge transport in an organic thin film transistor occurs at the interface of these two layers). Exemplary interfacial layers may be formed from silanes, such as those described in U.S. Pat. No. 7,968,871, the entire disclosure of which is hereby incorporated by reference in its entirety.

Materials suitable for use as source and drain electrodes include those of the gate electrode materials, for example, gold, silver, nickel, aluminum, platinum, conducting polymers, and conducting inks. In embodiments, the electrode materials provide low contact resistance to the semiconductor. In embodiments, the thickness of the electrodes may be, for example, from about 40 nanometers to about 1 micrometer, such as from about 70 nm to about 700 nm, or from about 100 nm to about 400 nm. The OTFT devices of the present disclosure may contain a semiconductor channel. In embodiments, the semiconductor channel width may be, for example, from about 5 micrometers to about 5 millimeters, such as from about 75 micrometers to about 3 millimeters, or from about 100 micrometers to about 1 millimeter. In embodiments, the semiconductor channel length may be, for example, from about 1 micrometer to about 1 millimeter, such as from about 3 micrometers to about 500 micrometers, or from about 5 micrometers to about 100 micrometers.

The source electrode may be grounded, and a bias voltage of, for example, from about 0 volt to about 80 volts, such as from about 5 volts to about 70 volts, or from about 10 volts to about 50 volts, may be applied to the drain electrode to collect the charge carriers transported across the semiconductor channel when a voltage of, for example, about +10 volts to about −80 volts is applied to the gate electrode. The electrodes may be formed or deposited using according to any suitable process.

In embodiments, a barrier layer may also be deposited on top of the TFT to protect it from environmental conditions, such as light, oxygen and moisture, and so forth, which can degrade the electrical properties of the TFT. Such barrier layers may simply consist of polymers.

The various components of the OTFT may be deposited upon the substrate in any order, as is seen in the Figures. The phrase "upon the substrate" refers, for example, to the location of a component relative to the substrate, but does not necessarily require that each component directly contact the substrate. In embodiments, the gate electrode and the semiconductor layer may both be in contact with the dielectric layer. In embodiments, the source and drain electrodes may both be in contact with the semiconducting layer. The semiconducting polymer formed according to the instant disclosure may be deposited onto any appropriate component of an organic thin-film transistor (OTFT) to form a semiconducting layer of that transistor.

The performance of a semiconductor device may be measured by the field effect mobility and the current on/off ratio of the overall transistor. In embodiments, the semiconductor devices produced according to the instant disclosure exhibit enhanced resistance to the adverse effects of oxygen. In embodiments, devices incorporating the polythiophenes of the present disclosure exhibit relatively high current on/off ratios, and their performance does not substantially degrade as rapidly as similar devices fabricated from regioregular polythiophenes, such as regioregular poly(3-alkylthiophene). Field effect mobility is measured in units of $cm^2/V*s$. A transistor according to the instant disclosure may have, in embodiments, a field effect mobility of at least about 0.001 $cm^2/V*sec$, such as at least about 0.01 $cm^2/V*sec$, or at least about 0.02 $cm^2/V*sec$. In embodiments, the transistor may have a mobility of from about $10^{-4}$ to about $10^{-1}$. In embodiments, the current on/off ratio for the transistor according to the instant disclosure may be at least about 1000, such as at least about 2000, or at least about 3000. In embodiments, the current on/off ratio for a thin film transistor according to the instant disclosure may be from about $10^2$ to about $10^5$, such as from about $10^3$ to about $10^4$.

In embodiments, incorporation of PQT monomer in poly (3-alkylthiophene) chain suppresses its propensity towards oxidative doping. For example, incorporation of the PQT monomer in poly(3-alkylthiophene) chain suppresses its propensity towards oxidative doping. Accordingly, the copolythiophenes according to the instant disclosure are more stable in ambient conditions and the devices fabricated from these copolythiophenes are functionally more stable than that of regioregular polythiophenes, such as regioregular poly(3-alkylthiophene). For example, poly-3-alkylthiophenes (for example, poly-3-hexylthiophene) are not stable in air, and (relative to the copolythiophenes according to the instant disclosure) degrade quickly (i.e., within a matter of hours or days).

Thus, thin film transistor devices using regioregular poly (3-alkylthiophene) as a semiconducting layer fabricated in ambient conditions would show low field-effect mobility and low on/off current ratios. In contrast, the devices according to the instant disclosure can be carried out in ambient conditions, provide higher current on/off ratios, and their performance characteristics do not substantially change as rapidly as that of regioregular poly(3-alkylthiophene), such as regioregular poly(3-hexylthiophene), when no rigorous procedural precautions have been taken to exclude ambient oxygen during material preparation, device fabrication, and evaluation. The stability in air of the composition according to the instant disclosure corresponds to the proportion of PQT in the copolymer. That is to say, a higher composition of PQT monomer corresponds to greater stability in ambient conditions. In embodiments, copolythiophenes according to the instant disclosure do not deteriorate under ambient conditions and thus do not have to be handled in an inert atmosphere. Thus, the processes employing the copolythiophenes according to the instant disclosure, such as processes to produce TFTs of OTFTs are simpler and more cost effective, and the fabrication thereof can be applied to large scale production processes.

Figure 2:
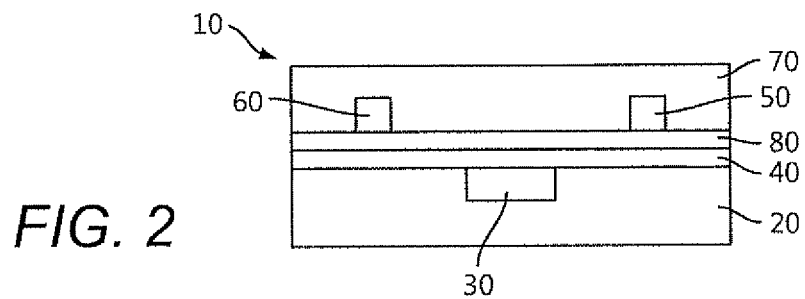
FIG. 2 represents a first embodiment of a thin film transistor made using the present process.

FIGS. 2-5 illustrate various OTFT embodiments or configurations that may incorporate the copolythiophenes according to the instant disclosure. In FIG. 2, the OTFT 10 comprises a substrate 20 in contact with the gate electrode 30 and a dielectric layer 40. Although here the gate electrode 30 is depicted within the substrate 20, this is not required. However, of some importance is that the dielectric layer 40 separates the gate electrode 30 from the source electrode 50, drain electrode 60, and the semiconducting layer 70. The source electrode 50 contacts the semiconducting layer 70. The drain electrode 60 also contacts the semiconducting layer 70. The semiconducting layer 70 runs over and between the source and drain electrodes 50 and 60. Optional interfacial layer 80 is located between dielectric layer 40 and semiconducting layer 70.

Figure 3:
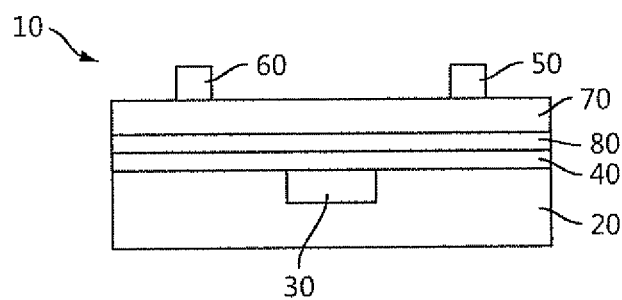
FIG. 3 represents a second embodiment of a thin film transistor made using the present process.

FIG. 3 illustrates a second OTFT embodiment or configuration. The OTFT 10 comprises a substrate 20 in contact with the gate electrode 30 and a dielectric layer 40. The semiconducting layer 70 is placed over or on top of the dielectric layer 40 and separates it from the source and drain electrodes 50 and 60. Optional interfacial layer 80 is located between dielectric layer 40 and semiconducting layer 70.

Figure 4:
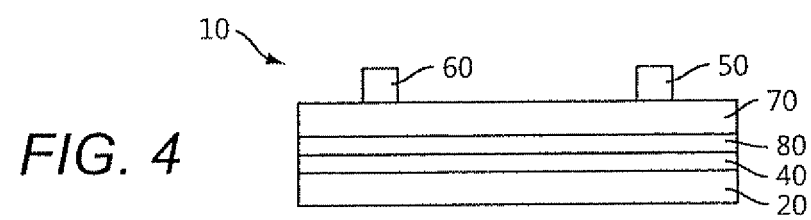
FIG. 4 represents a third embodiment of a thin film transistor made using the present process.

FIG. 4 illustrates a third OTFT embodiment or configuration. The OTFT 10 comprises a substrate 20 which also acts as the gate electrode and is in contact with a dielectric layer 40. The semiconducting layer 70 is placed over or on top of the dielectric layer 40 and separates it from the source and drain electrodes 50 and 60. Optional interfacial layer 80 is located between dielectric layer 40 and semiconducting layer 70.

Figure 5:
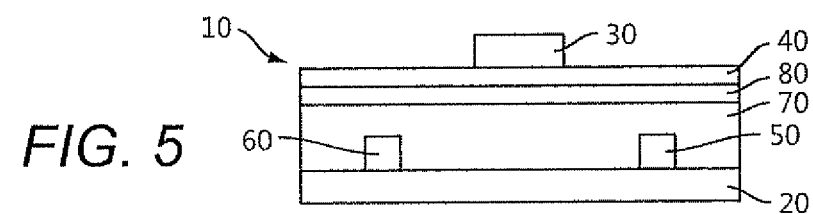
FIG. 5 represents a fourth embodiment of a thin film transistor made using the present process.

FIG. 5 illustrates a fourth OTFT embodiment or configuration. The OTFT 10 comprises a substrate 20 in contact with the source electrode 50, drain electrode 60, and the semiconducting layer 70. The semiconducting layer 70 runs over and between the source and drain electrodes 50 and 60. The dielectric layer 40 is on top of the semiconducting layer 70. The gate electrode 30 is on top of the dielectric layer 40 and does not contact the semiconducting layer 70. Optional interfacial layer 80 is located between dielectric layer 40 and semiconducting layer 70.

The polythiophenes and applications thereof for fabrication of flexible and ultra low-cost electronics described herein are further illustrated in the following examples. All parts and percentages are by weight unless otherwise indicated.

EXAMPLES

Example 1

A copolythiophene was prepared according to scheme I as set forth above. To a 250 mL reaction flask were added 2.0 g $FeCl_3$ and 20 mL of chlorobenzene with gentle stirring for about 2 minutes. A mixture of compound (2) (PQT monomer where $R_1$ represents $C_{12}H_{24}$) and compound (3) (3-hexylthiophene) in 60 mL of chlorobenzene was added through an adding funnel. The reaction mixture was stirred at approximately 50° C. for 48 hours. The mixture was then cooled to room temperature and poured into approximately 400 mL of MeOH and stirred for 1 hour.

The crude product was collected by filtration and then dissolved in approximately 200 mL of toluene. The mixture was then stirred with approximately 100 mL of $NH_4OH$ and 400 mL of methanol for 4 hours at room temperature.

The organic layer was separated and washed with 300 mL of distilled water three times using a separating funnel, and then precipitated in 400 mL of MeOH. The solid was collected by filtration and purified by soxhlet extraction with hexane overnight, and then with chlorobenzene for about 6 hours. The product was precipitated in MeOH, collected by filtration, and then dried under vacuum for 24 hours, yielding 0.6 g of a copolythiophene according to formula (1), where $R_1$ represents dodecyl ($C_{12}H_{25}$) and $R_2$ represents hexyl ($C_6H_{13}$). Copolythiophene (1) had a Mw=69,700 and Mn=28,900 relative to polystyrene standards.

Electronic Performance for Organic Thin Film Transistors (OTFTs)

Deposition films were made by dissolving the copolythiophene of Example 1 in xylene. The solutions contained 1.0 wt % of the copolythiophene.

Organic thin-film transistors (OTFTs) were then made using the deposition solutions. The fabrication and characterization of the OTFTs was done under ambient conditions without taking any precautions to isolate the materials and devices from exposure to air, moisture, or light.

Bottom-gate top contact TFT devices were built on n-doped silicon wafer as the gate electrode with a 200-nm thermal silicon oxide ($SiO_2$) as the dielectric layer. The $SiO_2$ surface was modified with octyltrichlorosilane (OTS-8) by immersing a cleaned silicon wafer substrate in 0.1 M OTS-8 in toluene at 60° C. for 20 minutes. The wafer was subsequently rinsed with toluene and isopropanol, and then dried with an air stream.

The semiconductor layer was deposited on the OTS-8-modified $SiO_2$ layer by spin coating the deposition solution at 1000 rpm, followed by vacuum drying, to produce a 20-nm thick semiconductor layer.

Subsequently, the gold source and drain electrodes were deposited by vacuum evaporation through a shadow mask, thereby creating a series of TFTs with various channel length (L) and width (W) dimensions. All of the devices were annealed by heating the dried TFT devices in a vacuum oven at 120-140° C. for 30 minutes, and then cooled to room temperature.

Patterned transistors with channel length of 90 or 190 microns and channel width of 1 or 5 mm were used for current/voltage (I-V) measurements. The OTFT devices were then evaluated using a Keithley SCS-200 characterization system under ambient conditions.

The field effect mobility for all the OTFTs was extracted from the saturated regimes using the following equation at saturated regime:

$$I_D = C_i \mu \left(\frac{W}{2L}\right)(V_G - V_T)^2$$

where $I_D$ is the drain current, $C_i$ is the capacitance per unit area of the gate dielectric layer, $V_G$ is the gate voltage, and $V_T$ is the threshold voltage.

The experimental results demonstrated that OTFTs with copolythiophene (1) as a semiconducting layer showed good electronic performance with a mobility of 0.02 $cm^2/V*s$ and a current on/off ratio of 4000 when the semiconductor layer was fabricated from xylene solution (1.0 wt %).

OTFTs with regioregular poly(3-hexylthiophene) as a semiconducting layer showed a much lower average mobility (0.001 $cm^2/Vs$) and current on/off ratio (~1000) compared to the copolythiophene (1) when the devices were fabricated in ambient conditions. The solubility of PQT (where $R_1$ represents dodecyl) was very poor, and it could not be dissolved in xylene, even with a very low concentration (0.1 wt %). The solubility of PQT was poor even in chlorinated solvents. A hot solution of PQT in dichlorobenzene with 0.3 wt % was gelled upon cooling to room temperature within several minutes due to its poor solubility. In contrast, the coating solutions prepared from the copolymer (1) were much more stable at room temperature, and remained stable for a much longer period of time (on the order of hours or days).

The experimental results showed that xylene could be used as a coating solvent for Copolythiophene (1). In other words, the solubility of Copolythiophene (1) in xylene was significantly increased as compared to PQT.

The OTFTs with Copolythiophene (1) as the semiconducting layer showed good electronic performance, with a mobility of 0.02 cm$^2$/V*sec, and a current on/off ratio of 4000 when the semiconductor layer was fabricated from xylene solution (1 wt %) in ambient conditions.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A composition comprising: a random copolythiophene of formula (1):

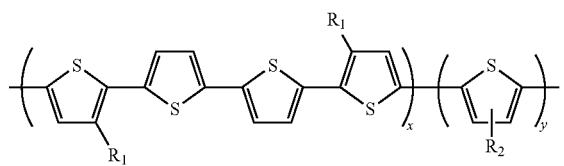

(1)

wherein $R_1$ and $R_2$ are the same or different and each is an alkyl, alkoxyalkyl, or perhaloalkyl; and x and y are each greater than 0 and together equal 100 mole percent.

2. The composition of claim 1, wherein $R_1$ is an alkyl having from about 6 to about 20 carbon atoms.

3. The composition of claim 1, wherein $R_2$ is an alkyl having from about 1 to about 20 carbon atoms.

4. The composition of claim 1, wherein x is from about 10 to about 95 mole percent.

5. The composition of claim 1, wherein the random copolythiophene has a polydispersity index of from about 1.5 to about 6.0.

6. The composition of claim 1, wherein the random copolythiophene has a weight average molecular weight of from about 2,000 to about 100,000.

7. A semiconductor composition comprising:
a non-chlorinated solvent; and
the composition of claim 1.

8. The semiconductor composition of claim 7, wherein $R_1$ and $R_2$ are each alkyl side chains containing from about 1 to about 20 carbon atoms.

9. The semiconductor composition of claim 7, wherein the non-chlorinated solvent is selected from the group consisting of toluene, xylene, mesitylene, trimethylbenzene, tetrahydronaphthalene, ethylbenzene, diethylbenzene, propylbenzene, and ethyl toluene.

10. The semiconductor composition of claim 7, wherein the solubility of the random copolymer in the non-chlorinated solvent is from about 0.05 wt % to about 10 wt %.

11. An electronic device comprising a semiconducting layer, wherein the semiconducting layer comprises a random copolythiophene of formula (1):

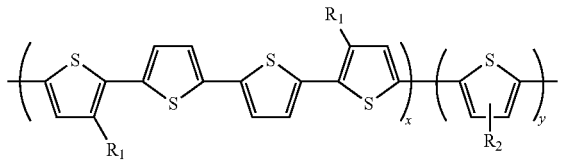

(1)

wherein
$R_1$ and $R_2$ are the same or different and each is an alkyl having from about 1 to about 20 carbon atoms; and
x and y are each greater than 0 and together equal 100 mole percent.

12. The electronic device of claim 11, wherein $R_1$ and $R_2$ are each alkyl chains containing from about 5 to about 20 carbon atoms.

13. The electronic device of claim 11, wherein the device is a thin film transistor.

14. The electronic device of claim 13, wherein the electronic device has a current on/off ratio of from about $10^2$ to about $10^5$.

15. The electronic device of claim 13, wherein the electronic device has a mobility of from about $10^{-4}$ to about $10^{-1}$.

16. A method of making a random copolythiophene, the method comprising:
copolymerizing a compound of the formula (2):

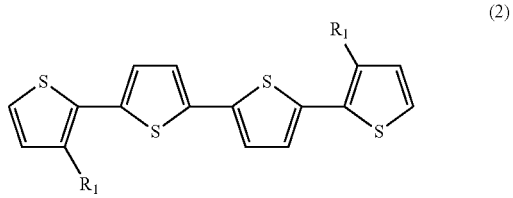

(2)

wherein $R_1$ is an alkyl having from about 6 to about 25 carbon atoms;
with a compound of formula (3):

(3)

wherein $R_2$ is an alkyl having from about 1 to about 20 carbon atoms;
to form a random copolythiophene of formula (1):

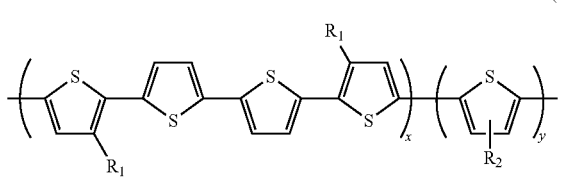

(1)

wherein x and y are each greater than 0 and together equal 100 mole percent.

17. The method according to claim 16, wherein the random copolythiophene of formula (1) is synthesized with $FeCl_3$ oxidation polymerization.

18. The composition of claim 1, wherein $R_1$ is a perhaloalkyl; and $R_2$ is an alkyl, alkoxyalkyl, or perhaloalkyl; and x and y are each greater than 0 and together equal 100 mole percent.

19. The composition of claim 18, wherein $R_2$ is a perhaloalkyl.

20. The composition of claim 18, wherein $R_2$ is an alkyl having from about 1 to about 20 carbon atoms.

* * * * *